2 Sheets—Sheet 2.
C. BROWN & D. L. MILLER.
BALING PRESS.
No. 81,745. Patented Sept. 1, 1868.
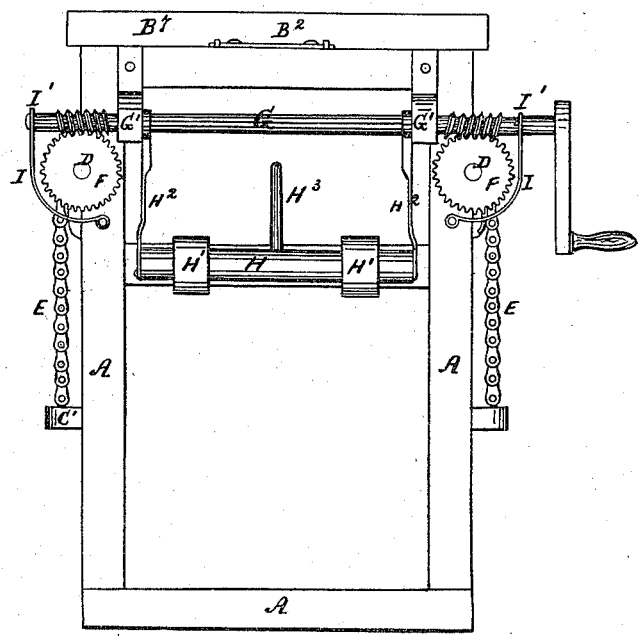
Fig: 5.

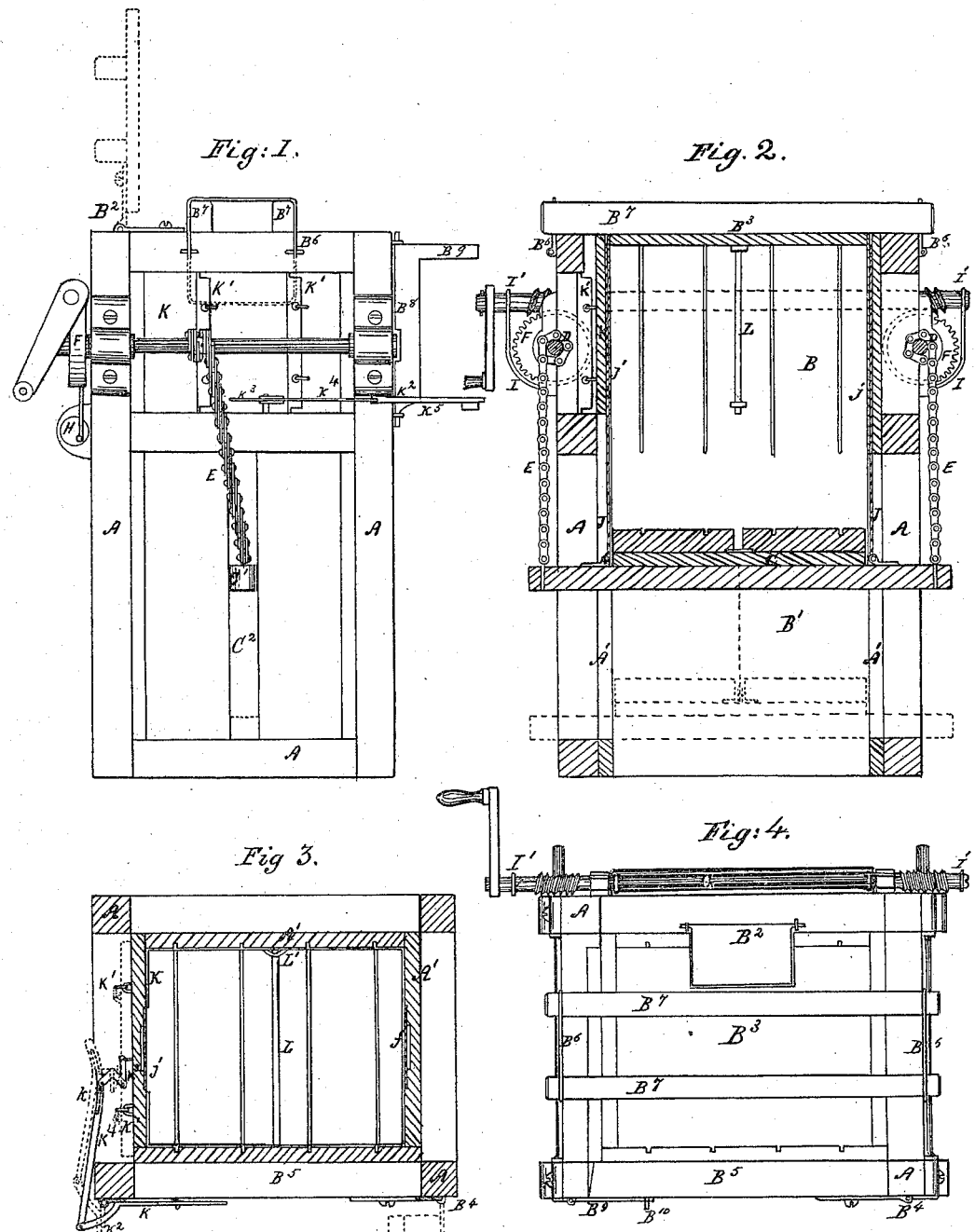

United States Patent Office.

CHARLES BROWN, OF BUFFALO, NEW YORK, AND DAVID L. MILLER, OF MADISON, NEW JERSEY.

Letters Patent No. 81,745, dated September 1, 1868.

---

IMPROVED BALING-PRESS.

---

*The Schedule referred to in these Letters Patent and making part of the same.*

---

TO ALL WHOM IT MAY CONCERN:

Be it known that we, CHARLES BROWN, of the city of Buffalo, county of Erie, and State of New York, and DAVID L. MILLER, of Madison, in the county of Morris, and State of New Jersey, have invented a new and improved Press for Baling Short-Cut Hay; and we do hereby declare that the following is a full, clear, and exact description thereof, reference being had to the accompanying drawings, making a part of this specification.

The nature of our invention consists,

First, in covering the slots cut in the sides of the press-box for the passage of the follower by metal plates, connected to and moving with the follower, so that the escape of the hay through said slots, in the act of pressing, is prevented, and a virtually tight press-box secured.

Second, in making one side of the press-box, in addition to the ordinary top and front doors thereof, movable, so that after the bale is pressed and bound, the pressure upon all sides thereof may be relieved, and the bale removed from the press-box without difficulty.

Third, in a certain arrangement of friction-brakes, by which the descent of the follower may be controlled.

Fourth, in a mode of connecting together the links of the chains, by which motion is communicated to the follower, which enables them to wind spirally upon the windlass-shafts or drums, and prevents he riding or mounting of the successive coils, the one upon the other.

Fifth, in the arrangement of a hinged partition in the press-box, so that two small bales may be pressed at the same time.

In the drawings—

Figure I is a side elevation of our said improved baling-press,

Figure II is a front sectional elevation,

Figure III is a cross-section,

Figure IV is a top plan, and

Figure V is a back side elevation thereof.

Like letters refer to like parts in each of the figures.

A A represent a rectangular frame of wood, lined inside with plank, A', and forming the press-box B B$^1$, the upper part, B, of which contains the bale when pressed, and the lower part or extension, B$^1$, of which is traversed by the follower, which effects the compression of the bale. The top side of part B is hinged, as shown at B$^2$, to the main frame A, forming a door, D$^3$, and the front side thereof is also hinged to the frame A, as shown at B$^4$, forming a door, B$^5$. These doors, B$^3$ and B$^5$, when opened, permit the removal of the bale, the top door only being opened in filling the press-box with loose hay. The top door B$^3$ is secured against the pressure of the follower by stout bails, B$^6$, hinged to the frame, and swinging over the projecting ends of the cross-heads B$^7$, passing over the door. The front door, B$^5$, is secured by the hinged plate B$^8$, connected to the corner post of frame, and lapping over upon the door, said plate having a lever or arm, B$^9$, attached to it, with which a hook, B$^{10}$, on the door, engages when the door is closed, and holds fast the same.

C represents the follower, which traverses the part B$^1$ in compressing the bale, the follower having a strong cross-head, C$^1$, passing across under it, the ends of which cross-head project through the vertical slots C$^2$, cut in the sides of the press-box, said slots extending through the whole length of the part B$^1$, which the follower traverses.

D D represent the windlass-shafts or drums, from which motion is communicated to the follower through the chains E, leading therefrom, and connecting to the projecting ends of the cross-head C$^1$. The shafts D D are located on opposite sides of the press-box, at or near the base of the part B, and supported in strong bearings attached to the corner posts of the frame A.

F F are worm-wheels keyed upon the back ends of shafts D D, and G is a worm-shaft, extending across the back side of the press-box, and engaging with said worm-wheels, and, by its revolution, imparting motion thereto. The driving-power is applied to this worm-shaft in any convenient manner. The worm-shaft is supported in slotted bearings, G', attached to frame A, and is made to throw in and out of gear with the worm-wheels, as follows:

H is a rock-shaft, located below the worm-shaft, and supported by bearings, H¹, upon the cross-rail of the frame A. H² are connections leading up from the ends of the rock-shaft, to which they are connected eccentrically, and embracing the worm-shaft, so as not to interfere with the revolution thereof. H³ is a hand-lever attached to rock-shaft, by which a partial revolution may be given thereto, which will cause the eccentric connections H² to raise or lower the worm-shaft, and throw the same in or out of gear with the worm-wheels, according to the direction in which the lever is moved.

When the worm-shaft is thrown out of gear, the windlass-shafts are free to revolve, and the weight of the follower and cross-head will cause the chains to unwind therefrom, and the follower and cross-head to descend. Owing to the very considerable weight of the follower and cross-head, their descent would be too rapid unless checked by the application of some external resistance to the revolution of the windlass-shafts.

Provision is therefore made for this resistance, by the arrangement of friction-brakes, I, to act upon the worm-wheels.

These brakes I consist simply of curved metal plates, one end of each being connected to the frame A, and the other end to the worm-shaft, as shown at I', in a manner not to interfere with the free revolution of said shaft. The upward movement of the worm-shaft, by the means before described, which throws the same out of gear with the worm-wheels, will also bring the friction-plates I in contact with the worm-wheels, and thereby oppose any required resistance to the descent of the follower and cross-head.

The chains E are composed of flat links, formed with eyes at each end, through which the joint-pins pass in a common and well-known manner. My improvement consists in so arranging the links as that the axial line of the chain shall incline to the joint-pins, it being, in chains of this class as heretofore constructed, at right angles to the joint-pins.

This result is accomplished by lapping each successive link upon the same side of the preceding link, instead of alternating, as is the common construction. (This arrangement of the links is most clearly shown in Fig. I.) The connection of the chain to the windlass-barrels is, therefore, considerably upon one side of the line upon which the cross-head moves, although the joints remain parallel with the shaft, so that the chain may wind properly thereon. The line of the chain being inclined to the shaft, will cause it to wind spirally thereon, without the successive coils riding or mounting the preceding ones.

The slots C² in the press-box are covered by the thin metal plates J, hinged to the follower, and moving therewith. These plates are, in turn, covered by plates J', secured to the part B of the press-box, but these plates J' are not essential. The effect of the plates J is to prevent the escape of the hay through the slots C², and therefore adapt the press especially to the baling of short-cut hay.

The side K of the part B is connected to the frame A by two hinged bars, K¹, (as in a common parallel ruler,) so that it may be swung back a short distance with a parallel movement, in order to fully release the bale after the doors B³ and B⁵ are opened. The swinging movement is effected by a bent lever, K², having its fulcrum on the frame A, one arm connected to the side K by a link, K³, and operated by a link, K⁴, connecting with its other arm, and with an arm, K⁵, projecting from the hinged plate B³, so that when the plate B³ is swinging back to release the front door, it will also move the side K.

The link K⁴ may have its connection with the bent lever slotted, as shown at K⁶, so that the door B³ may be fully released and opened, if desired, before the movement of the side K takes place.

The part B of the press-box is provided with a thin metal partition, L, hinged to one side thereof, as shown at L', and dividing the same into two equal parts. The lower edge of the plate is sharpened, so that it may divide the hay as it is brought up from the part B¹ by the movement of the follower, and thereby form two distinct bales of hay at the same operation. The hinging of the plate is to prevent unequal pressure upon opposite sides thereof, in the act of pressing, should there be a greater quantity of hay on one side than upon the other. Four distinct bales may be formed at the same time, if desired, by the use of two false followers inserted into the press-box when the same is half filled with hay. This dividing of the bale is only desirable when the demands of local trade require the hay to be put up in very small quantities. The partition L is or may be made so that it may be removed or inserted, as occasion may require.

The operation and manner of manipulating machines of this class are too well understood to require any special explanation thereof.

Having thus described our improved machine, what we claim, and desire to secure by Letters Patent, is—

1. The arrangement of the covering-plates J, connected to the follower, and moving therewith, substantially as herein described.

2. The arrangement of the removable side K of the part B of the press-box, suspended and moving upon the hinged bars K¹ K¹, substantially as and for the purpose set forth.

3. The combination and arrangement of the friction-brakes I with the worm-shaft G and worm-wheels F F, and eccentric rock-shaft H and its connections, substantially as described.

4. The hinged partition L, arranged in the part B of the press-box, as and for the purpose set forth.

CHARLES BROWN,
DAVID L. MILLER.

Witnesses:
W. H. FORBUSH,
VICTOR H. BECKER.